United States Patent [19]

Hata et al.

[11] Patent Number: 5,656,557

[45] Date of Patent: Aug. 12, 1997

[54] PROCESS FOR PRODUCING VARIOUS GASES FOR SEMICONDUCTOR PRODUCTION FACTORIES

[75] Inventors: Yuichi Hata, Tokyo; Jun Sasaki, Kanagawa; Mamoru Kawamura, Mie; Maki Nakamura, Kanagawa; Kazuya Taki, Kanagawa; Shuichi Okada, Kanagawa, all of Japan

[73] Assignee: Nippon Sanso Corporation, Tokyo, Japan

[21] Appl. No.: 351,476

[22] PCT Filed: Apr. 22, 1994

[86] PCT No.: PCT/JP94/00676

§ 371 Date: Feb. 9, 1995

§ 102(e) Date: Feb. 9, 1995

[87] PCT Pub. No.: WO94/24501

PCT Pub. Date: Oct. 27, 1994

[30] Foreign Application Priority Data

Apr. 22, 1993 [JP] Japan ..................... 5-096200

[51] Int. Cl.$^6$ ..................................... C01B 21/00
[52] U.S. Cl. .............. 423/219; 422/171; 422/177; 423/351; 423/239.2; 438/800; 62/615
[58] Field of Search ............... 423/351; 422/171, 422/177; 437/248, 250

[56] References Cited

U.S. PATENT DOCUMENTS 5,441,719  8/1995  Nagamura et al. ............... 423/351

FOREIGN PATENT DOCUMENTS

| 735366 | 5/1966 | Canada ........................ 423/351 |
| 1241 | 1/1965 | Japan ............................ 423/351 |
| 52-42158 | 10/1977 | Japan . |
| 58-95181 | 6/1983 | Japan . |
| 61-225568 | 10/1986 | Japan . |
| 61-228286 | 10/1986 | Japan . |
| 64-54187 | 3/1989 | Japan . |
| 2-307506 | 12/1990 | Japan . |
| 3-160294 | 7/1991 | Japan . |
| 2129115 | 5/1984 | United Kingdom ............ 423/351 |

*Primary Examiner*—Wayne Langel
*Attorney, Agent, or Firm*—Armstrong, Westerman, Hattori, McLeland, & Naughton

[57] ABSTRACT

Disclosed is a production process and apparatus of high-purity air and various air material gases for semiconductor production factories that, together with enabling the production of high-purity air, also enables the production high-purity nitrogen simultaneous to the production of oxygen-rich air as the finished product. This is accomplished by compressing feed air to a pressure of 3 to 10 kg/cm$^2$G, introducing this compressed air into a catalyst tower (8) to convert the carbon monoxide, hydrocarbons and hydrogen contained in the feed air into carbon dioxide and water, and introducing the purified air into an adsorption tower (12a) or (12b) after cooling the heated air following catalytic reaction to remove carbon dioxide, water and other minute amounts of impurities by adsorption. A portion of the resulting purified air is removed as product high-purity air, while the remainder is introduced into a main heat exchanger (18) where it is cooled to substantially the liquefaction temperature. After cooling, the air is introduced into a single rectification tower (19) followed by liquefaction rectification. High-purity nitrogen is then removed from the top of said single rectification tower which is then obtained as product high-purity nitrogen after going through the main heat exchanger (18). On the other hand, oxygen-rich liquefied air is drawn out from the bottom of the single rectification tower (19). This oxygen-rich liquefied air is then introduced into a condenser-evaporator. (24) where it is vaporized and then drawn out. This drawn out air is then introduced into the main heat exchanger (18) where it is heated to an intermediate temperature and then removed. This oxygen-rich air is then introduced into an expansion turbine (35) where it is expanded and lowered in temperature. After generation of cold, the cold is recovered followed by obtaining of the product gas in the form of purified oxygen-rich air.

2 Claims, 1 Drawing Sheet

5,656,557

PROCESS FOR PRODUCING VARIOUS GASES FOR SEMICONDUCTOR PRODUCTION FACTORIES

TECHNICAL FIELD

The present invention relates to a process and apparatus for producing and supplying high-purity nitrogen used in large amounts at semiconductor production factories, and purified air (high-purity air) and oxygen-rich air that can be effectively used in said factories.

BACKGROUND ART

Large amounts of high-purity nitrogen are conventionally used for various applications in the semiconductor industry. In investigation of the breakdown of these applications of high-purity nitrogen reveals that high-purity nitrogen is being used in a large amount in locations that do not necessarily require such. For example, although high-purity nitrogen gas is presently used for the sealing gas of pure water tanks used for washing semiconductors, in the case of not controlling the amount of dissolved oxygen, high-purity air of a prescribed purity is sufficient. Similarly, although high-purity nitrogen gas is also used for the bubbling gas for regeneration of an ion exchange resin for production of ultra-pure water, high-purity air of a prescribed purity can be used provided such air is able to be obtained.

In addition, although high-purity nitrogen is used in air guns and semiconductor substrate storage boxes used in various semiconductor production processes in order to avoid adherence of various types of impurities, such as hydrocarbons including oils and sulfur compounds including sulfur oxides ($SO_x$) and the like, on semiconductor substrates (wafers), high-purity air can be used instead of this high-purity nitrogen if such impurities are removed from air. In addition, high-purity air can also be substituted for high-purity nitrogen used as the carrier gas in substrate transport systems such as Bernoulli chucks and air levitation conveyors in semiconductor production equipment.

Similarly, there are also several possible processes in which high-purity air can be used instead of high-purity nitrogen or high-purity oxygen currently used as a semiconductor material gas. For example, high-purity oxygen used as the diluent gas of material gases such as carbon tetrafluoride in the etching process can be substituted with high-purity air, while air can also be used instead of the high-purity nitrogen and high-purity oxygen used in the purging process of nonreducing gases, such as chlorine, hydrogen chloride and hydrogen bromide, used in semiconductor production processes, provided it has a prescribed purity.

In view of the above, attempts have been made to reduce costs by using high-purity air instead of expensive high-purity nitrogen and high-purity oxygen in various applications. The specifications of high-purity air when used in these applications are required to be such that the levels of hydrogen ($H_2$), carbon monoxide (CO), methane ($CH_4$; total hydrocarbons (THC) as methane), water ($H_2O$), carbon dioxide ($CO_2$), nitrogen compounds ($NO_x$) and sulfur compounds ($SO_x$) and so forth are 1 ppm or less.

In addition, since there are many processes in the production of semiconductors that are maintained at constant temperature and constant humidity, such as equipment for obtaining constant temperature and constant humidity, e.g. for air conditioning and maintaining pure water temperature, their cost is a considerable amount. Consequently, these processes are considered for reducing costs. In general, steam is supplied from a boiler to serve as a heating source, and in the heating furnace for this boiler, heating is usually performed with a fuel oil/air burner. Thus, by replacing the air of this fuel oil/air burner with oxygen-rich air, it is possible to significantly increase the combustion efficiency of the heating furnace.

Moreover, although purified air, from which water and carbon dioxide have been removed, has been conventionally used for various instruments and sealing, such air has been supplied to accommodate a relatively small demand by compressing with a small compressor and so forth, and then purified with a purifier. In addition, air for instrumentation in air liquefaction separation apparatuses has normally been used by leading into an adsorber of a pre-treatment process, and then branching off a small amount of purified air.

However, since conventional air liquefaction and separation apparatuses were only able to obtain purified air by branching off a small amount of dry air for instrumentation use as described above, there were no apparatuses that are able to produce large amounts of purified air of a high purity (high-purity air) that satisfies the above-mentioned specifications as the finished product. Namely, since minute amounts of each of the above-mentioned impurities are normally present in the atmosphere, in each of the processes of air liquefaction and separation, some of these are removed while others are contained in gas that is fed in after being concentrated. Since strict specifications were required for purity with respect to high-purity nitrogen in the prior art, various innovations were made in the process to accommodate these specifications in order to obtain satisfactory purity. In addition, the remaining exhaust gas separated from the product high-purity nitrogen was extracted is released into the atmosphere with the exception of that used as regeneration gas of the above-mentioned adsorber.

Therefore, it is an object of the present invention to provide a production process and apparatus for Various types of gases for semiconductor production factories that enable production of high-purity nitrogen used in semiconductor production factories, along with producing high-purity air that satisfies the above-mentioned requirements while simultaneously producing oxygen-rich air as the finished product.

Disclosure of the Invention

The production process of various gases for semiconductor production factories of the present invention comprises: introducing feed air compressed to predetermined pressure, for example, 3 to 10 kg/cm²G onto a catalyst tower to convert the carbon monoxide, hydrocarbons and hydrogen into carbon dioxide and water by catalytic reaction; cooling the heated air following said catalytic reaction to 5° to 10° C.; introducing the air into an adsorption tower and purifying by removing carbon dioxide, water and other minute amounts of impurities by adsorption; obtaining a portion of the resulting purified air as product high-purity air; introducing the remainder of the purified air into a main heat exchanger and cooling to substantially the liquefaction temperature by heat exchange with return gas; performing liquefied rectification by introducing the purified air after cooling into a single rectification tower; drawing out high-purity nitrogen from the top of said single rectification tower and obtaining it as product high-purity nitrogen gas after recovery of cold with the main heat exchanger, together with drawing out oxygen-rich liquefied air from the bottom of the above-mentioned single rectification tower; allowing to expand and introducing to a condenser-evaporator of the single rectification tower; introducing the oxygen-rich liquefied air removed after gasification in said condenser-evaporator into the main heat exchanger and heating to an intermediate temperature; introducing the oxygen-rich air at said intermediate temperature into an expansion turbine so as to lower the temperature by expansion and generate cold; again introducing the expanded and cooled oxygen-rich air into the main heat exchanger to recover the cold; and, obtaining the resulting oxygen-rich air as product.

In addition, in the process of the present invention, the product oxygen-rich air obtained in the above-mentioned process is supplied as combustion auxiliary gas of the heating furnace that supplies heat source for constant temperature equipment and so forth in semiconductor production factories.

Moreover, the production apparatus of various gases for semiconductor production factories of the present invention comprises: a compressor that compresses feed air to a prescribed pressure; a catalyst tower, into which compressed air of which the pressure has been raised with said compressor, that converts minute amounts of carbon monoxide, hydrocarbons and hydrogen contained in said feed air into carbon dioxide and water by catalytic reaction; a cooler that cools the heated air after catalytic reaction; an adsorption tower that removes carbon dioxide, water and other minute amounts of impurities in the feed air by adsorption; a conduit tube that draws out a portion of the purified air removed from said adsorption tower as product high-purity air; a main heat exchanger that heat exchanges the remainder of the purified air with return gas and cools it to substantially the liquefaction temperature; a single rectification tower, into which cooled purified air after cooling with said main heat exchanger is introduced, that performs liquefied rectification and then respectively draws out high-purity nitrogen from the top of the tower and oxygen-rich liquefied air from the bottom of the tower; a condenser-evaporator that, together with forming liquefied nitrogen by heat exchanging said high-purity nitrogen removed from the top of said single rectification tower with said oxygen-rich liquefied air removed from the bottom of the single rectification tower, vaporizes the oxygen-rich liquefied air; and, an expansion turbine that expands and lowers the temperature of the oxygen-rich air vaporized with said condenser-evaporator.

According to the above-mentioned apparatus, large amounts of high-purify air can be produced in accommodation of large demand, and prescribed amounts of high-purity air can be produced together with conventional high-purity nitrogen. In addition, the purified oxygen-rich air can also be supplied as boiler combustion auxiliary gas.

Consequently, high-purity air, high-purity nitrogen and oxygen-rich air required in semiconductor production factories can be supplied at low cost according to their required amounts. Namely, together with being able to supply high-purity air to processes requiring high-purity air and high-purity nitrogen to processes requiring high-purity nitrogen in semiconductor production processes, since the combustion efficiency of a combustion furnace serving as a heating source can be improved by oxygen-rich air, a significant contribution is made to reducing the unit utility source required for semiconductor production in terms of the overall factory. In addition, even with respect to the apparatus for supplying these gases, combustion efficiency of the apparatus is greater than in the prior art from the viewpoint that the compressed feed air is able to be supplied without any waste in the form of finished products, as well as energy resulting from combustion in oxygen-rich air is used in the heating processes.

BEST MODE FOR CARRYING OUT THE INVENTION

Figure 1:
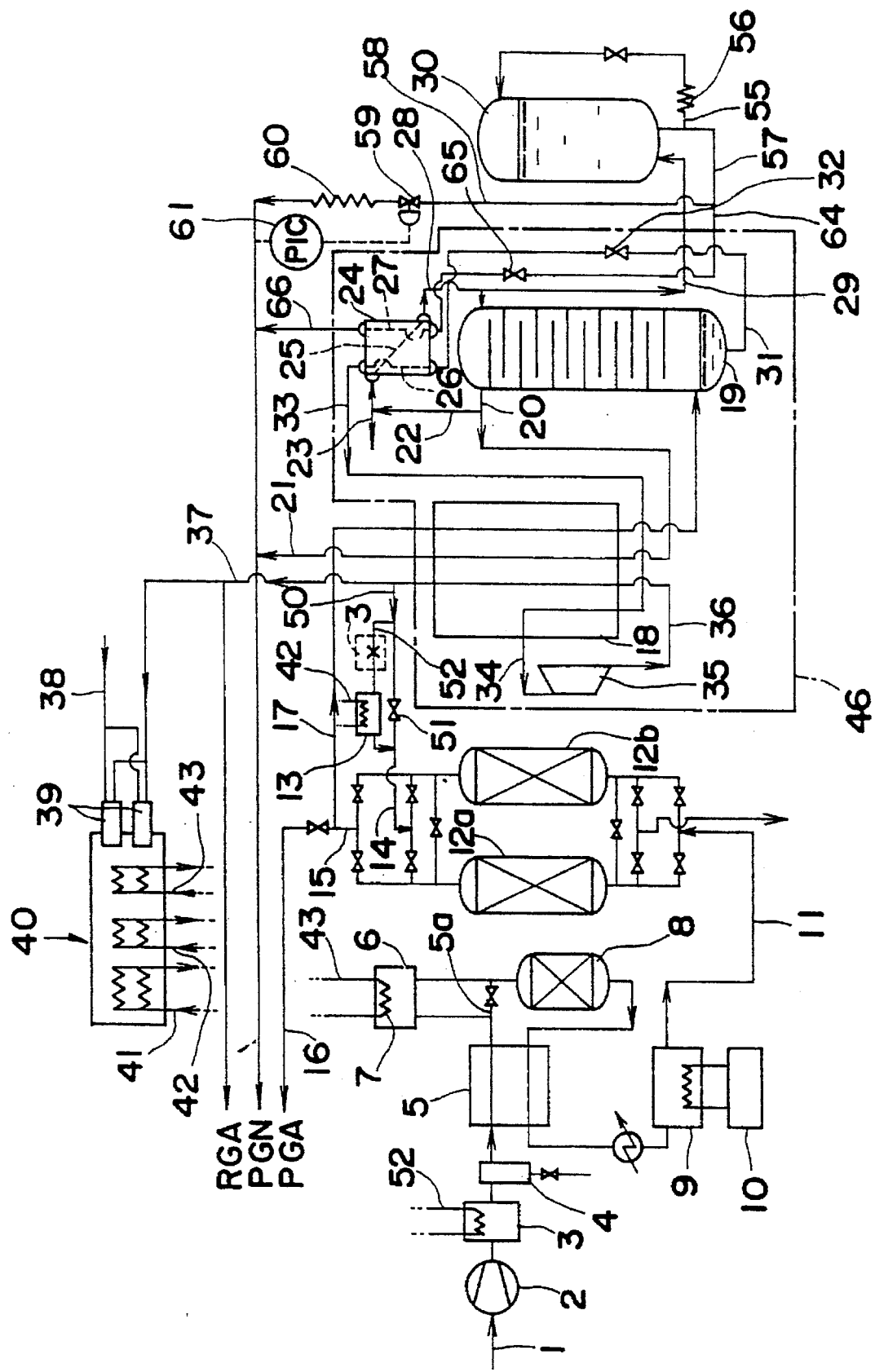
FIG. 1 is a system diagram of a gas production apparatus indicating an embodiment of the present invention.

FIG. 1 is a system diagram indicating an embodiment of the present invention. 12000 $Nm^3/hr$ of feed air introduced from a conduit tube 1 is removed after being compressed to 3 to 10 $kg/cm^2G$, and for example, about 5 $kg/cm^2G$, with a compressor 2. Although varying according to the conditions at the site of the apparatus, the feed air contains ordinary air components as well as hydrogen ($H_2$) at about 1 to 5 ppm, carbon monoxide (CO) at about 1 to 5 ppm, methane (converted to methane ($CH_4$) as total hydrocarbon (THC)) at about 2 ppm, sulfur compounds ($SO_x$) at about 0.1 ppb and nitrogen oxides ($NO_x$) at about 0.05 ppb.

The compressed air removed from the compressor 2 at about 120° C. is cooled to about 40° C. with a heat exchanger 3, for heating recycled gas to be described later, and an aftercooler (not shown). After the saturated moisture is then separated with a drain separator 4, the air is introduced into the heat exchanger 5 where the temperature is raised to about 300° C. by heat exchange with a counterflow air removed from catalyst tower 8. Moreover, the air then enters a heater 6 where it is further heated to about 350° C. with a heating medium heater 7 using a heating medium heated with a heating furnace 40 to be described later. The heated air is then introduced to the catalyst tower 8. It should be noted that at this time, if the air is able to be sufficiently heated to the prescribed temperature in the heat exchanger 5, the air may be allowed to bypass the heater 6 by going through a bypass path 5a.

The catalyst tower 8 is filled with platinum (Pt) and/or palladium (Pd) that reacts minute amounts of hydrogen, carbon monoxide and hydrocarbons contained in the feed air with oxygen to convert them into water and carbon dioxide. In the catalytic reaction in this catalyst tower 8, by using platinum and/or palladium for the catalyst and setting the reaction temperature to at least 350° C., minute amounts of hydrogen and carbon monoxide are allowed to react with oxygen in the air to nearly completely convert them into water and carbon dioxide. Simultaneously, the majority of hydrocarbons such as methane present can also be converted into water and carbon dioxide. As examples of the catalyst(s) used here, although the platinum and palladium are best in terms of promoting the reaction and durability, other catalysts can also be selected in consideration of price, catalyst life and so forth, examples of which include manganese (Mn), nickel (Ni), chromium (Cr) and cobalt (Co). In addition, each of these catalysts may naturally be used alone or in the form of compound catalysts containing the above-mentioned noble metals. At this time, in cases when there are no strict restrictions on the allowable level of hydrocarbon content in the product high-purity air, the apparatus may be operated with the temperature of catalyst tower 8 set to 90° to 200° C. In this case, methane and so forth are not completely removed, but rather a slight amount is mixed in the product gas.

The high-temperature compressed feed air removed from the catalyst tower 8 is lowered to a temperature of about 45° C. by undergoing heat exchange with the counterflowing compressed air in the heat exchanger 5. Moreover, this air is then introduced into a cooler 9 where it is cooled to 5° to 10° C. by a circulating refrigerant from a refrigerator 10. The compressed feed air after cooling is introduced to one of either of a pair of adsorption towers 12a and 12b that are used in turn by switching. Here, a portion of the impurities contained in the air, such as the water, carbon dioxide, unreacted methane (various types of hydrocarbons), nitrogen compounds and sulfur compounds and so forth, are removed by adsorption. "Molecular Sieve 13X" is used most optimally for the adsorbent filled into the adsorption towers 12a and 12b for removing the minute amounts of impurities by adsorption. By optimally setting the amount of adsorbent filled with respect to the amount of air passing through the tower, minute amounts of impurities in the feed air can be reliably removed down to a level of 1 ppm or less. In addition, the present invention is not limited to the use of Molecular Sieve 13X, but substantially the similar effects can be obtained with other zeolite adsorbents as well, such as "Molecular Sieve 4A" and "Molecular Sieve 5A". Moreover, by packing layers of moisture adsorbent such as alumina gel or silica gel near the inlet for the above-mentioned zeolite adsorbent, first removing the moisture contained in the compressed air with moisture adsorbent, and then removing the above-mentioned other minute amounts of impurities with the zeolite adsorbent, the feed air can be purified more efficiently. Incidentally, the filling rate of the moisture adsorbent, in the form of either alumina gel or silica gel, and the zeolite adsorbent is optimally 1:9 to 3:7 in terms of weight ratio.

In addition, since the adsorption towers 12a and 12b are used in turn by switching, when one is used for the adsorption process, the other is used for the regeneration process. The regeneration process is further divided into a heating stage and a cooling stage. In the heating stage, a portion of purified oxygen-rich air to be described later is heated to about 130° C. with the heat exchanger 3 for heating regeneration gas, which heats by recovering the heat of compression of the above-mentioned feed air, and a heating medium heater 13 to be described later. By then feeding the purified oxygen-rich air from a conduit tube 14 into either adsorption tower 12a or 12b in the heating stage from the outlet side, the above-mentioned impurities adsorbed in the previous process are discharged after being desorbed from the adsorbent. Purified oxygen-rich air that has entered the cooling stage after completion of this heating stage and bypassed the heat exchanger 3 for heating regeneration gas and heating medium heater 13 is similarly continuously fed from the conduit tube 14 to adsorption towers 12a and 12b in the cooling stage from the outlet side. The temperature is then lowered to about 5° C. within said adsorption towers 12a and 12b. Adsorption tower 12a or 12b, in which the temperature has lowered, then enters the adsorption process of the next process, with the compressed feed air being introduced from the inlet side, while the other adsorption tower enters the regeneration process.

The purified air at a pressure of about 5 kg/cm²G removed from the outlet of the adsorption tower 12a or 12b is in the form of purified air from which the impurities in the air, namely hydrogen, carbon monoxide, hydrocarbons, water, carbon dioxide, nitrogen compounds and sulfur compounds, have been removed down to a level of 1 ppm or less (or to a level below the level present in the feed air with respect to nitrogen compounds and sulfur compounds). A portion of about 2400 to 6000 Nm³/hr of this purified air (PGA) at about 5 kg/cm²G removed from this adsorption tower 12a or 12b is branched to a conduit tube 16 from a conduit tube 15 where it is used as sealing gas of purified water tanks, bubbling gas of ion exchange resins and so forth in each of the processes in semiconductor production factories as previously described.

The remaining 6000 to 9600 Nm³/hr of purified air branched to the conduit tube 16 is introduced to a main heat exchanger 18 within a cold box 46 from a conduit tube 17. It is then removed after being cooled nearly to the liquefaction temperature, and then is introduced into the lower portion of a single rectification tower 19. As a result of rectification of the purified feed air in the single rectification tower 19, nitrogen gas is separated to the top of the tower, while oxygen-rich liquefied air is separated to the bottom of the tower.

High-purity nitrogen gas that has been separated to the top of the tower and satisfies the requirements of the above-mentioned impurity concentrations is removed into a conduit tube 20 where it is divided into two fractions. One of the fractions enters the main heat exchanger 18 where it undergoes heat exchange with the purified air causing it to be heated to about 3° C. It is then removed into a conduit tube 21 after which 2200 to 3500 Nm³/hr is supplied to each of the processes of the semiconductor production factory in the form of product high-purity nitrogen (PGN).

The other fraction of high-purity nitrogen gas enters a heat exchange passage 25 of condenser-evaporator 24 from a conduit tube 22 where it condenses by undergoing heat exchange with oxygen-rich liquefied air of passage 26, thus changing to liquefied nitrogen. This liquefied nitrogen is removed into a conduit tube 28 where it is divided into two fractions. The majority becomes the reflux liquid of single rectification tower 19, while a portion of 0 to 250 Nm³/hr is introduced into a high-purity liquid nitrogen storage tank 30 and stored in the form of the product liquid nitrogen. By adjusting the amount of gases produced corresponding to the demand volume of the purified air and high-purity nitrogen, this high-purity liquid nitrogen storage tank 30 can store any excess products in the form of liquid nitrogen, and is therefore used during increases in demand for high-purity nitrogen or during start-up time. It should be noted that reference numeral 23 is a branching tube that releases low boiling point components such as hydrogen, helium (He) and neon (Ne).

On the other hand, 3800–6100 Nm³/hr of oxygen-rich liquefied air accumulated in the bottom of the tower is introduced into the condenser-evaporator 24 via a conduit tube 31 and an expansion valve 32. It then enters the heat exchange passage 26 where it is vaporized by undergoing heat exchange with high-purity nitrogen of passage 25 resulting in the formation of oxygen-rich air. This oxygen-rich air (RGA) is introduced into the main heat exchanger 18 from a conduit tube 33 where it is heated to an intermediate temperature. After being expanded and lowered in temperature by being introduced into an expansion turbine 35 from a conduit tube 34, it again enters the main heat exchanger 18 from a conduit tube 36 where it undergoes heat exchange with the purified air and is then removed from a conduit 37 after being heated to about 3° C.

The majority of the oxygen-rich air of said conduit tube 37 is introduced into burners 39, 39 of heating furnace (boiler) 40. This oxygen-rich air is then supplied for combustion by mixing with fuel such as fuel oil or LPG from a conduit tube 38. Water supplied to the heating furnace 40 from a conduit tube 41 is converted into steam in the heating furnace 40, which is then used as a heat source of each heating apparatus and constant temperature apparatus in the semiconductor production factory.

In addition, a conduit tube 42 is a tube which supplies high-temperature heating medium other than water. Adsorption tower regenerated gas heated in the heating furnace 40 is heated with the heating medium heater 13 to about 130° C. and then returns, and thus circulates after again being heated with the heating furnace 40. Similar to the conduit tube 42, a conduit tube 43 is a tube which introduces another high-temperature heating medium. Compressed feed air is heated to about 300° to 350° C. with the heater 6 at the inlet of the catalyst tower and then returns, and thus circulates after again being heated.

In addition to each of these conduit tubes 41, 42 and 43, it goes without saying that coils for heating each of the heating media can be provided in the heating furnace 40 corresponding to the required temperature, which are then used as heater heat sources by heating the heating media. By using the oxygen-rich air from the conduit 37 as combustion auxiliary gas of the heating furnace for supplying this heat source, combustion efficiency can be remarkably improved, thus enabling energy costs to be reduced.

In addition, a portion of the oxygen-rich air branched from the conduit pipe 37 towards the heating furnace 40 is introduced as regeneration gas to the adsorption tower 12a or 12b in a regeneration process from the conduit tube 14 from a conduit tube 50 via a valve 51. This regeneration gas enters the heat exchanger 3 from a bypass 52 by closing a valve 51 according to the cycle. Said regenerated gas is heated by the heat of compression of compressor 2 after which it enters the heating medium heater 13. After being heated to 130° C. by high-temperature heating medium coming from the heating furnace 40 via the conduit tube 42, it is introduced into the adsorption tower 12a or 12b, whichever is in the heating stage. The gas is then removed from said adsorption tower 12a or 12b after desorbing impurities adsorbed. In the case this oxygen-rich air is in excess in the above-mentioned applications, it is either supplied to other applications outside the system from the conduit tube 53 or released.

Heating energy having a low unit cost can be supplied to the heating processes of the apparatus as well as each of the heating processes in the semiconductor'production factory due to the high combustion efficiency of heating furnace 40 resulting from the use of the oxygen-rich air. Moreover, since the oxygen-rich air is high-purity purified air from which sulfur oxides and nitrogen oxides have been removed, there is no concern over corrosion of various components in the heating furnace 40.

In addition, when the demand for gas of the line (conduit tube 21) that supplies the high-purity nitrogen gas increases causing a decrease in pressure in the conduit tube 21, a system is provided that detects this decrease, draws out stored liquid from the high-purity liquid nitrogen storage tank 30, and, after vaporizing said liquid nitrogen into a gas, supplies the gas. Namely, high-purity liquid nitrogen stored in the high-purity liquid nitrogen storage tank 30 passes through a control valve 59, which is operated according to the signal of pressure indicating regulator 61, from conduit tubes 57 and 58. The high-purity liquid nitrogen is then vaporized with an evaporator 60 after which it flows together into the conduit tube 21. The delivery pressure of this high-purity liquid nitrogen is obtained by vaporizing a small amount of liquid nitrogen drawn out from a conduit tube 55 with a pressurization evaporator 56 and then reintroducing it into the storage tank 30. A conduit tube 64, a valve 65 and a conduit tube 66 comprise a system for supplying cold to the single rectification tower 19 via the heat exchange passage 27 of condenser-evaporator 24 in order to shorten start-up time.

It should be noted that the system of the present invention is not limited to the above-mentioned embodiment, but rather can be applied to various types of processes employed in ordinary high-purity nitrogen production apparatuses operated by air liquefaction separation.

We claim:

1. A process for producing gases for semiconductor production factories comprising:

introducing feed air compressed to a pressure of 3–10 $kg/cm^2G$ into a catalyst tower to convert carbon monoxide, hydrocarbons and hydrogen in said feed air into carbon dioxide and water by catalytic reaction;

cooling the heated air following said catalytic reaction to 5° to 10° C.;

introducing the cooled air into an adsorption tower packed with alumina gel or silica gel near the inlet and zeolite thereon in a filling rate from 1:9 to 3:7 in terms of weight ratio and purifying the air by removing at least carbon dioxide and water by adsorption;

obtaining a portion of the resulting purified air as product high-purity air;

introducing the remainder of the purified air into a main heat exchanger and cooling the purified air to about a liquefaction temperature of the purified air by heat exchange with return gas;

performing liquefied rectification by introducing the purified air after cooling into a single rectification tower having a top and a bottom;

drawing out high-purity nitrogen from the top of said single rectification tower and obtaining product high-purity nitrogen gas after recovery of cold in the main heat exchanger, together with drawing out oxygen-rich liquefied air from the bottom of the single rectification tower;

allowing the oxygen-rich liquefied air to expand and introducing the air to a condenser-evaporator of the single rectification tower;

introducing the oxygen-rich liquefied air removed after gasification in said condenser-evaporator into the main heat exchanger and heating the air to an intermediate temperature;

introducing the oxygen-rich air at said intermediate temperature into an expansion turbine so as to lower the temperature by expansion and generate cold;

again introducing the expanded and cooled oxygen-rich air into the main heat exchanger to recover cold; and, obtaining the resulting oxygen-rich air as product.

2. The process for producing gases for semiconductor production factories according to claim 1, further including supplying said oxygen-rich air product as combustion auxiliary gas to a heating furnace that supplies heat to constant temperature equipment in said semiconductor production factories.

* * * * *